US010687394B2

(12) United States Patent
Schick et al.

(10) Patent No.: US 10,687,394 B2
(45) Date of Patent: Jun. 16, 2020

(54) ENERGY TRANSFER COOKING DEVICE ACCESSORY, METHOD OF MANUFACTURING AN ENERGY TRANSFER COOKING DEVICE ACCESSORY AND COOKING DEVICE

(71) Applicant: RATIONAL Aktiengesellschaft, Landsberg am Lech (DE)

(72) Inventors: David Schick, Landsberg (DE); Thomas Schreiner, Kaufering (DE)

(73) Assignee: RATIONAL AKTIENGESELLSCHAFT (DE)

( * ) Notice: Subject to any disclaimer, the term of this patent is extended or adjusted under 35 U.S.C. 154(b) by 331 days.

(21) Appl. No.: 15/814,160

(22) Filed: Nov. 15, 2017

(65) Prior Publication Data

US 2018/0139804 A1    May 17, 2018

(30) Foreign Application Priority Data

Nov. 15, 2016    (DE) .......................... 10 2016 121 868

(51) Int. Cl.
*H05B 6/12* (2006.01)
*B21D 26/00* (2006.01)
(Continued)

(52) U.S. Cl.
CPC ............. *H05B 6/129* (2013.01); *B21D 26/00* (2013.01); *F24C 15/00* (2013.01); *H01F 38/14* (2013.01); *H05B 6/365* (2013.01); *Y02B 40/126* (2013.01)

(58) Field of Classification Search
CPC .......... H05B 6/129; H05B 6/365; H05B 6/02; H05B 6/12; H05B 6/1254; B21D 26/00;
(Continued)

(56) References Cited

U.S. PATENT DOCUMENTS 5,025,489 A * 6/1991 Yamaguchi ............ H05B 6/129
                                                            219/760
2013/0205863 A1* 8/2013 Loesch .................. B21D 22/06
                                                            72/342.7
(Continued)

FOREIGN PATENT DOCUMENTS

| DE | 32 32 480       | 3/1984 | ............... B12K 1/12 |
| DE | 20 2009 000 990 | 4/2009 | ............... H05B 6/36 |
| JP | 2008-110168     | 5/2008 | ............... A47J 27/04 |

OTHER PUBLICATIONS

"Blech" (sheet metal) Wikipedia entry, Version 12 Aug. 2017 https://de.wikipedia.org/wiki/Blech, accessed Aug. 31, 2017, with English translation, 8 pgs.
(Continued)

*Primary Examiner* — Janie M Loeppke
(74) *Attorney, Agent, or Firm* — Hayes Soloway P.C.

(57) ABSTRACT

An energy transfer cooking device accessory is described which includes a plastically deformed metal sheet (and a transformer-like power transfer unit which has a primary circuit and a secondary circuit. The plastically deformed metal sheet is arranged between said primary circuit and said secondary circuit. Simultaneously said plastically deformed metal sheet forms a magnetically permeable coupling point for said primary circuit and said secondary circuit, so that a magnetic flux from said primary circuit to said secondary circuit via said plastically deformed metal sheet is guaranteed. Furthermore, a method of manufacturing an energy transfer cooking device accessory and a cooking device are described.

16 Claims, 1 Drawing Sheet

(51) Int. Cl.
*H01F 38/14* (2006.01)
*F24C 15/00* (2006.01)
*H05B 6/36* (2006.01)

(58) Field of Classification Search
CPC .... B21D 26/02; B21D 26/021; B21D 26/026; F24C 15/00; H01F 38/14; H01F 27/365; H01F 27/367
USPC .................................................. 219/600–677
See application file for complete search history.

(56) References Cited

U.S. PATENT DOCUMENTS

2016/0093433 A1* 3/2016 Endou ..................... H01F 38/14
307/104
2017/0019957 A1* 1/2017 Fryshman .............. H05B 6/105

OTHER PUBLICATIONS

"Iduktionskochfeld" (induction hob) Wikipedia entry, Version Jul. 12, 2017 https://de.wikipedia.org/wiki/Iduktionskichfeld, accessed Aug. 31 2017, with English translation, 12 pgs.
German Search Report issued in German Patent Appln. Serial No. 10 2016 121 868.5 dated Aug. 31, 2017, with English summary translation, 18 pgs.

* cited by examiner

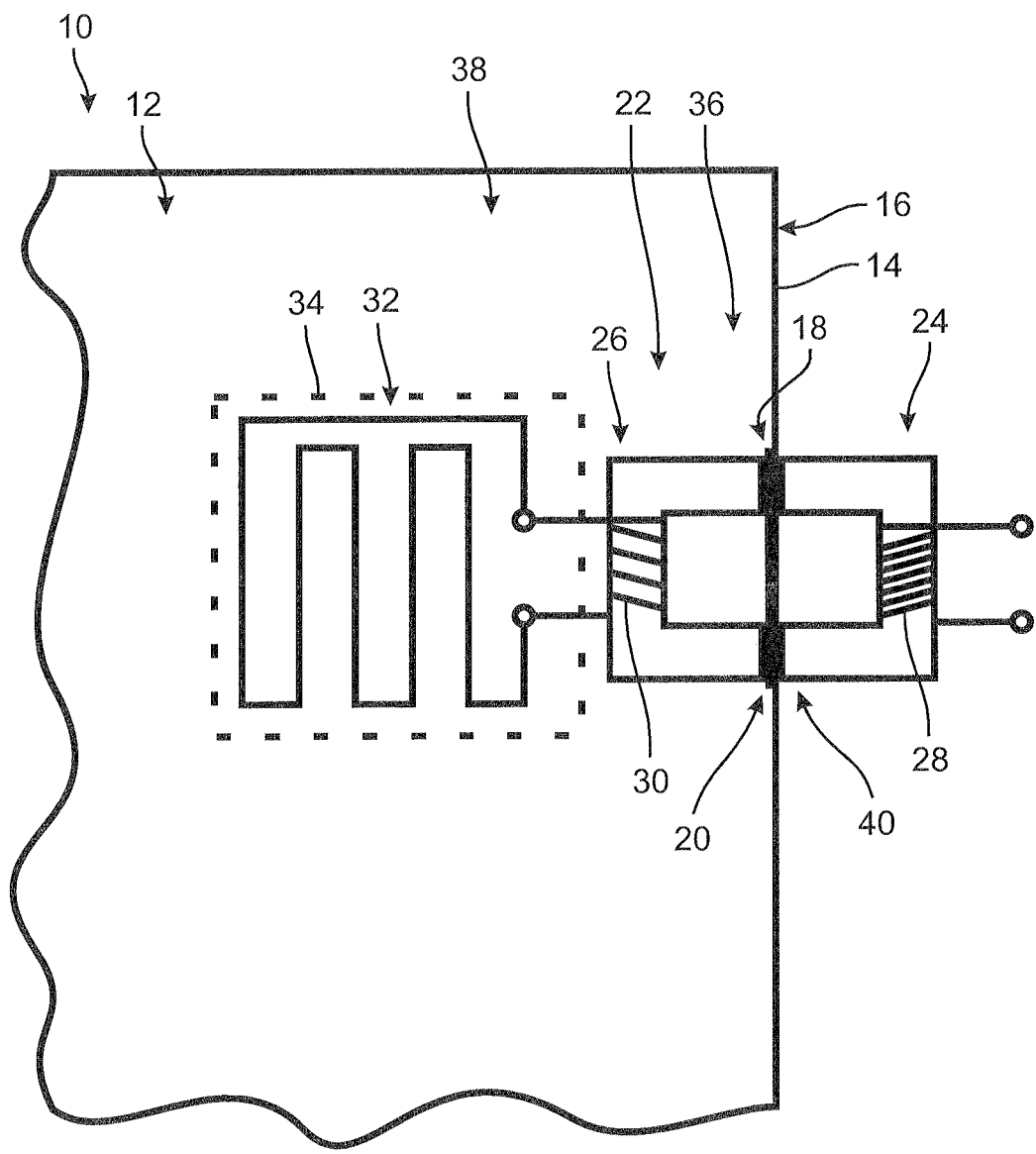

ENERGY TRANSFER COOKING DEVICE ACCESSORY, METHOD OF MANUFACTURING AN ENERGY TRANSFER COOKING DEVICE ACCESSORY AND COOKING DEVICE

TECHNICAL FIELD

Embodiments of the present disclosure relate to an energy transfer cooking device accessory, a method of manufacturing an energy transfer cooking device accessory and a cooking device.

BACKGROUND OF THE INVENTION

Cooking devices in professional and large-scale kitchens have a cooking chamber in which food is cooked. Normally this is done by means of heating elements and fans to generate a cooking chamber atmosphere as homogeneous as possible to which the food is exposed.

In addition, certain applications provide for electrical power to be available in the cooking chamber itself in order to cook the food or monitor the cooking process. In a first approach, a corresponding cable is laid into the cooking chamber to provide electrical power. However, the problem in this case is that connector plugs are required inside the cooking chamber to enable a removable cooking accessory such as a contact heating plate to be connected. The plug connector would have to transfer high power, entailing further problems concerning electrical insulation, particularly under the conditions prevailing inside the cooking chamber.

A further problem is that the wall of the cooking chamber has to be thermally insulated in the case of alternative cable ducting in order, on the one hand, to prevent the cooking chamber atmosphere from escaping and, on the other hand, to prevent the temperature in an adjacent electrical installation space accommodating the electronic components of a cooking device from rising too much. However, thermal insulation is very expensive, resulting in an increase in the expense of installation and the associated manufacturing cost.

For this reason, in the prior art, power transfer units are provided in which the electrical energy is to be transferred into the cooking chamber cordlessly or wirelessly. To this end, resonant power transfer units comprising a transmitter and a receiver are normally used. The transmitter and the receiver each have at least one free oscillating circuit which includes a corresponding transmitting or receiving coil.

Between the transmitter and the receiver there is normally the wall of the cooking chamber which consists of stainless steel. The electrically conductive cooking chamber wall prevents efficient wireless energy transfer because high power can only be transferred at high frequencies by means of resonant coupling. The frequencies normally used in power transfer are above 10 kHz. By contrast, the oscillating circuits for low frequencies would be unmanageably large. The corresponding resonant frequencies of the respective coils are matched to one another. Otherwise a poor level of efficiency ensues, such that wireless energy transfer is either impossible or is only possible to a limited extent. In fact, induced shielding currents cause electrical losses to increase quadratically with the frequency, for which reason in the case of typical transfer frequencies the major proportion of the power remains in the cooking chamber wall.

In addition, non-resonant magnetic power transfer requires a good magnetic coupling between source and receiver coils. This is possible in the case of a transformer when both coils are placed on a common closed, highly permeable core. However, in the case of a cooking device this core is interrupted because the cooking chamber wall is not designed to be opened. The cooking chamber wall thus forms a gap at two places between the two halves of the core, this gap comprising the non-magnetic material—in other words, the metal sheet comprising the cooking chamber wall. However, such gaps reduce the coupling between the coils considerably. This increases the losses and larger coils are required in order to transfer the same amount of power.

The object of the invention is to provide a simply constructed transfer of wireless energy in the case of a cooking device by simple means and cost-effectively.

SUMMARY OF THE INVENTION

The object of the invention is achieved by an energy transfer cooking device accessory which comprises a plastically deformed metal sheet and a transformer-like power transfer unit, having a primary circuit and a secondary circuit, wherein the plastically deformed metal sheet is arranged between the primary circuit and secondary circuit and forms a magnetically permeable coupling point for the primary circuit and secondary circuit, so that a magnetic flux from the primary circuit to the secondary circuit via the plastically deformed metal sheet is guaranteed.

The fundamental concept behind the invention is to provide a non-resonant, inductive power transfer unit in accordance with the transformer principle wherein a free space distance between the primary circuit and the secondary circuit is avoided. This is possible because the plastically deformed metal sheet has a deformation region which has a locally considerably increased magnetic permeability by comparison with the remainder of the metal sheet in the non-plastically deformed region. This guarantees that the metal sheet in the local deformation region permits higher magnetic flux because the deformation region is magnetically permeable. The metal sheet is furthermore formed continuously of the same material since no additional or other material has been integrated into the metal sheet, said material for example being of higher magnetic permeability and being arranged between the primary and secondary circuits. The integrally formed metal sheet has only been machined locally in this way so that it has a local magnetically permeable coupling point.

In addition, because of the high permeability of the plastically deformed metal sheet in the deformation region it is possible for less coil and iron core material to be required in the primary and/or secondary circuits in order to achieve the desired efficiency of the power transfer unit. The deformation region of the metal sheet is provided locally in particular, so that the local deformation region provides the magnetically permeable coupling point for the primary and secondary circuits.

In general, the plastic deformation of the metal sheet is discernible from a section through the metal sheet due to the altered grain size in the deformation region; at microscopic level in other words.

The energy transfer cooking device accessory is a cooking device accessory which is used for energy transfer, particularly for wireless or cordless energy transfer through a cooking chamber wall of a cooking device. A portion of the cooking chamber wall may provide the magnetically permeable coupling point via which wireless energy transfer by correspondingly efficient means is possible.

One aspect provides for the metal sheet to be made of stainless steel sheet. It may be the non-magnetic stainless steel 1.4301, which inherently has no magnetic conductivity or magnetic permeability. Therefore magnetic flux between the primary and secondary circuits in a non-plastically deformed region of the stainless steel sheet is greatly reduced or is impossible, and thus the efficiency of wireless energy transfer would be highly limited. In the case of a non-plastically deformed stainless steel sheet, there would be an effective magnetic permeability of 181 at a distance of 40 cm, a magnetic permeability of the core of 2000, two gaps of 1 mm and a magnetic permeability of the cooking chamber wall of 1, which is too low for efficient energy transfer.

In particular, the metal sheet has a smooth surface. This improves the hygienic properties of the metal sheet since its surface can be cleaned more easily. In addition, the magnetic flux through the metal sheet can thus be controlled better since the saturation magnetization is not exceeded locally as would be the case if the metal sheet had an irregular surface. The smooth surface particularly relates to the two opposing faces of the metal sheet.

According to a further aspect, the metal sheet has been pressed, particularly with a press ram formed as a matrix. By this means the metal sheet in the deformation region has been plastically cold-formed locally. As a result of the plastic cold-forming, only a small reduction occurs in the thickness of the deformed metal sheet in the deformation region. The stability of the metal sheet is thus retained.

The object of the invention is further achieved by a method for the manufacture of an energy transfer cooking device accessory of the aforementioned kind, wherein a metal sheet and a transformer-like power transfer unit with a primary circuit and a secondary circuit are provided, wherein the metal sheet is plastically deformed, so that the metal sheet provides a magnetically permeable coupling point for the primary circuit and the secondary circuit of the transformer-like power transfer unit, wherein the primary circuit is arranged on a side of the plastically deformed metal sheet and the secondary circuit on the opposing side of the plastically deformed metal sheet. The primary and secondary circuits are each arranged at the magnetically permeable coupling point provided by the local deformation region of the metal sheet which has locally increased magnetic permeability.

In addition, the metal sheet can be pressed, particularly with a press ram provided as a matrix. The pressing of the metal sheet is a cost-effective process step in order to manufacture the local deformation region with increased magnetic permeability by simple means.

According to a further aspect, the metal sheet is pressed at least twice, wherein the metal sheet at least in the first pressing process is pressed with a matrix formed as a press ram, particularly wherein the press ram has a surface which results in high material deforming. For example, a matrix with a knurled surface may be used as the press ram. The subsequent second pressing process ensures that the metal sheet in the local deformation region has a surface as smooth as possible. By this means a defined surface results with consequently a controllable saturation magnetization due to the substantially identical thickness of the metal sheet in the local deformation region. Correspondingly, substantially identically formed magnetic flux paths are provided in the local deformation region or rather at the magnetically permeable coupling point.

If more than two pressing processes are envisaged, the metal sheet in all pressing processes apart from the final pressing process is pressed with a matrix formed as a press ram. This guarantees that the surface of the metal sheet is flat and smooth after deforming.

If more than two pressing processes are envisaged, complementary press rams can be used, consecutively in particular. The complementary press rams cause opposing deformations of the metal sheet, by which means the desired high material deformation is rapidly achieved.

The metal sheet may furthermore be warmed, in particular tempered or heated and slowly cooled. An additional ferritic phase occurs which results in an increase in magnetic permeability in the local deformation region of the plastically deformed metal sheet. In addition, residual stresses in the deformed metal sheet may be reduced, particularly in the deformation region, due to the increase in temperature. In particular, this is possible as a result of the moderate temperature increase (tempering), by which means a remaining resilient effect that may have arisen due to the deformation process is reduced.

A further aspect envisages that the metal sheet is plastically deformed across its entire thickness, so that a continuously deformed metal sheet portion is provided. Accordingly, the entire material of the metal sheet is deformed in the local deformation region. The deformation process differs from embossing the surface of the metal sheet in that with embossing only the material in a particular region of the surface is compressed.

Furthermore, the object of the invention is achieved by a cooking device, with a cooking chamber and a cooking chamber wall, wherein at least one portion of the cooking chamber wall provides the plastically deformed metal sheet of the energy transfer cooking device accessory of the aforementioned kind, so that the portion of the cooking chamber wall provides a magnetically permeable coupling point for the primary circuit and the secondary circuit of the transformer-like power transfer unit. In the case of the plastically deformed metal sheet, this may accordingly be the cooking chamber wall of the cooking chamber, so that the portion of the energy transfer cooking device accessory is already provided during manufacture of the cooking device. Subsequently only the transformer-like power transfer unit has to be arranged on both sides of the cooking chamber wall in order to provide the wireless energy transfer cooking device accessory. Accordingly, it is possible to provide by simple means a cooking device with an energy transfer cooking device accessory of the aforementioned kind.

In particular, a cooking device is thus envisaged which comprises an energy transfer cooking device accessory of the aforementioned kind.

In addition, the object of the invention is achieved by a cooking accessory with an energy transfer cooking device accessory of the aforementioned kind and a heating region which is electrically coupled to the cooking device accessory. The energy transferred wirelessly via the energy transfer cooking device accessory is utilised in the heating region correspondingly.

The cooking accessory is, for example, a smoker device. By means of the smoker device, food placed in a cooking chamber can be smoked. A smoker device is also referred to as a "smoker". The smoker device may provide a housing enclosing a receiving chamber for smoker materials, for example smoker fuel. The heating region warms the smoker materials accommodated in the receiving chamber, so that they emit a corresponding smoked aroma. The smoker device placed in the cooking chamber, whose power supply is provided wirelessly via the energy transfer cooking device accessory, accordingly emits the smoked aromas in the cooking chamber of the cooking device, by which means the food is smoked. The food located in the cooking chamber thereby absorbs the respective aromas during the cooking process.

BRIEF DESCRIPTION OF DRAWINGS

Additional advantages and properties of the invention are outlined in the following description and by the drawing FIG. 1 to which reference is made. The single figure is a schematic representation of a cooking device according to the invention with an energy transfer cooking device accessory according to the invention.

DETAILED DESCRIPTION OF THE INVENTION

In FIG. 1, a cooking device 10 is partially shown in a schematic manner because only a portion of the cooking chamber 12 is shown.

The cooking chamber 12 is bounded in the portion shown, amongst others, by a cooking chamber wall 14 formed by a metal sheet 16, particularly a stainless steel sheet (material 1.4301).

The cooking chamber wall 14 or rather the metal sheet 16 has been plastically deformed locally during manufacture so that a local deformation region 18 has formed. The deformation region 18 has a higher magnetic permeability than the remainder of the cooking chamber wall 14 or rather the metal sheet 16, although the remainder of the cooking chamber wall 14 and the deformation region 18 consists of the same material.

This is because the plastic deformation of the metal sheet 16 in the local deformation region 18 has caused the grain structure in the material of the metal sheet 16 to be altered as compared with a flat metal sheet. Correspondingly the deformation region 18 establishes a magnetically permeable coupling point 20 which permits magnetic flux through the otherwise magnetically non-conductive cooking chamber wall 14.

The magnetic conductivity has therefore been achieved by a deformation process of the cooking chamber wall 14 or rather the metal sheet 16 as no other material was used to establish the magnetically permeable coupling point 20.

The cooking device 10 also comprises a transformer-like power transfer unit 22 which is connected at the coupling point 20. The transformer-like power transfer unit 22 serves the cordless or wireless energy transfer from one side of the cooking chamber wall 14 to the other side of the cooking chamber wall 14, by which means wireless energy transfer into the cooking chamber 12 is possible for example. A cable ducting or similar is therefore not required.

The transformer-like power transfer unit 22 has a primary circuit 24 and a secondary circuit 26 wherein, in the embodiment shown, the primary circuit 24 is arranged outside the cooking chamber 12 and the secondary circuit 26 is arranged inside the cooking chamber 12. The primary and the secondary circuit 24, 26 each have a primary and secondary coil 28, 30 respectively wherein the number of turns may differ.

FIG. 1 further shows that the transformer-like power transfer unit 22 has a connected heating region 32, to which a cooking sheet 34, for example, is allocated, which is depicted by broken lines. Correspondingly the energy transferred wirelessly into the cooking chamber 12 via the transformer-like power transfer unit 22 can be used to warm the cooking sheet 34, by which means an electrically heated cooking surface can be arranged in the cooking chamber 12 without requiring a cable ducting to be insulated through the cooking chamber wall 14.

The transformer-like power transfer unit 22 and the deformation region 18 of the metal sheet 16 or rather the cooking chamber wall 14, namely a plastically deformed metal sheet portion, together form an energy transfer cooking device accessory 36.

The energy transfer cooking device accessory 36 may also form a cooking accessory 38 together with the heating region 32 and/or the metal sheet 34.

For example, the cooking accessory 38 is a smoker device via which food placed in the cooking chamber 12 can be smoked. The smoker device encompasses the heating region 32, which is coupled electrically to the energy transfer cooking device accessory 36. Via the electrical power provided wirelessly a smoker material placed inside a receiving chamber of the cooking accessory 38 or of the smoker device may be heated, so that it emits corresponding aromas in order to smoke the food in the cooking chamber 12.

Alternatively to the cooking sheet 34 with the heating region 32, another cooking accessory can be provided which requires electrical power and can be coupled to the energy transfer cooking device accessory 36, for example a temperature probe, in particular a core temperature probe.

In general the power transfer unit 22 is like a transformer because a free space distance, in other words a magnetically non-conducting path, between the primary and the secondary circuit 24, 26 is avoided. This is because the local deformation region 18 is magnetically permeable, particularly in a similar manner to the ferrite or iron material which at least partially provides the primary and/or secondary circuit 24, 26.

Accordingly, the ferrite and/or iron material of the primary and secondary circuits 24, 26, together with the magnetically permeable deformation region 18 or rather the coupling point 20 provided thereby establishes a multi-partite core 40 of the transformer-like power transfer unit 22 as is normal in the case of a transformer.

Gaps or magnetically non-permeable materials between the respective coils 28, 30 of the primary and of the secondary circuit 24, 26 are thus avoided, for which reason this is referred to as a transformer-like power transfer unit 22, which transfers the energy wirelessly from the one side of the cooking chamber wall 14 to the other side of the cooking chamber wall 14, particularly into the cooking chamber 12.

This is a non-resonant power or energy transfer, which is why the coils 28, 30 also do not have to be matched to one another in respect of their resonant frequencies. The efforts of manufacture are therefore considerably reduced.

The local deformation region 18 may be manufactured in particular by means of a pressing process in which the metal sheet 16 is deformed. This ensures that the material thickness of the metal sheet 16 only changes slightly in the local deformation region 18.

In addition, it may be envisaged that the metal sheet 16 is subsequently treated thermally, being exposed for example to a moderate rise in temperature (tempering), in order to reduce tensions in the metal sheet 16 which have been introduced as a result of the deformation process.

Alternatively or additionally, the metal sheet 16 can be heated strongly and then cooled slowly in order to introduce an additional ferritic phase into the austenitic material, resulting in an additional increase in the magnetic permeability of the metal sheet 16 in the local deformation region 18.

The metal sheet 16 is plastically deformed through its entire thickness, particularly in the deformation region 18, resulting in a continuously deformed metal sheet portion which represents the local deformation region 18. Correspondingly the deformation process is not an embossing operation, in which only the material in a particular region is compressed, in particular on the corresponding surface.

When deforming the metal sheet 16, the metal sheet 16 is deformed such that the resulting surface of the metal sheet 16 after the final deforming step is smooth and flat. A rough surface of the metal sheet 16 in the deformation region 18 would result in a partially strong bundling of the magnetic field lines during energy transfer, by which means the saturation magnetization could be exceeded locally, which has a negative impact on power transfer. In addition, such a surface is also more hygienic since it is easier to clean.

In general, the metal sheet 16 can be pressed during deforming wherein a press ram formed as a matrix is used, for example.

In particular it is then envisaged that the metal sheet 16 is pressed twice, with the metal sheet 16 initially being pressed with a press ram which has a surface that results in high material deforming. By this means the magnetic permeability of the metal sheet 16 in the local deformation region 18 can be increased greatly.

Because of the high material deforming, however, the metal sheet 16 in the deformation region 18 has an uneven and/or rough surface which is a disadvantage, on the one hand, in terms of cleaning, as well as in terms of wireless energy transfer, as has already been described. Therefore the metal sheet 16 pressed with such a press ram is pressed again in order to obtain a surface as smooth as possible.

Accordingly wireless energy transfer is created by simple means, being effected non-resonantly and inductively, and the transferred energy can be used by a cooking accessory by simple means.

As already explained, the heating region 32 can be associated with a cooking accessory 38 provided as a smoker device, so that the smoker device encloses the heating region 32 and the energy transfer cooking device accessory 36, the two of which are coupled to one another. The energy transfer cooking device accessory 36 ensures that wireless or cordless energy transfer is enabled via a cooking chamber wall 14 of the cooking device 10, in that the cooking accessory 38 is used, in other words the smoker device. The smoker device normally comprises a housing, which is not shown in detail, which surrounds a receiving chamber for smoker materials, for example smoker fuel. The heating region 32 then warms the smoker materials accommodated in the receiving chamber, so that they emit a corresponding smoked aroma. The smoker device placed in the cooking chamber 12, whose energy supply is effected wirelessly via the energy transfer cooking device accessory 36, accordingly emits the smoked aromas in the cooking chamber 12 of the cooking device 10, by which means the food is smoked.

The energy transferred wirelessly via the energy transfer cooking device accessory 36 is utilised correspondingly in the heating region 32 in order to smoke the food in the cooking chamber 12. A portion of the cooking chamber wall 14 may constitute the magnetically permeable coupling point 20 via which the wireless energy transfer is possible by correspondingly efficient means.

The invention claimed is:

1. An energy transfer cooking device accessory, comprising a plastically deformed metal sheet and a transformer-like power transfer unit, which has a primary circuit and a secondary circuit, wherein the plastically deformed metal sheet has a deformation region which has a locally considerably increased magnetic permeability by comparison with the remainder of the metal sheet in the non-plastically deformed region so that the metal sheet in the local deformation region permits higher magnetic flux as the deformation region is magnetically permeable, said plastically deformed metal sheet being arranged between said primary circuit and said secondary circuit and forms a magnetically permeable coupling point for said primary circuit and said secondary circuit, so that magnetic flux from said primary circuit to said secondary circuit via said plastically deformed metal sheet is guaranteed.

2. The cooking device accessory according to claim 1, wherein said metal sheet is a stainless steel sheet.

3. The cooking device accessory according to claim 1, wherein said metal sheet has a smooth surface.

4. The cooking device accessory according to claim 1, wherein said metal sheet is plastically deformed by pressing.

5. The cooking device accessory according to claim 4, wherein said metal sheet is plastically deformed with a press ram formed as a matrix.

6. A cooking accessory with an energy transfer cooking device accessory and a heating region, which is electrically coupled to said cooking device accessory, said energy transfer cooking device accessory comprising a plastically deformed metal sheet and a transformer-like power transfer unit, which has a primary circuit and a secondary circuit, wherein the plastically deformed metal sheet has a deformation region which has a locally considerably increased magnetic permeability by comparison with the remainder of the metal sheet in the non-plastically deformed region so that the metal sheet in the local deformation region permits higher magnetic flux as the deformation region is magnetically permeable, said plastically deformed metal sheet being arranged between said primary circuit and said secondary circuit and forms a magnetically permeable coupling point for said primary circuit and said secondary circuit, so that magnetic flux from said primary circuit to said secondary circuit via said plastically deformed metal sheet is guaranteed.

7. The cooking accessory according to claim 6, wherein said cooking accessory is a smoker device.

8. A method of manufacturing an energy transfer cooking device accessory according to claim 1, wherein a metal sheet and a transformer-like power transfer unit are provided with a primary circuit and a secondary circuit, said metal sheet being plastically deformed, so that said metal sheet forms a magnetically permeable coupling point for said primary circuit and said secondary circuit of said transformer-like power transfer unit, said primary circuit being arranged on one face of said plastically deformed metal sheet and said secondary circuit on the opposing face of said plastically deformed metal sheet.

9. The method according to claim 8, wherein said metal sheet is plastically deformed by pressing.

10. The method according to claim 9, wherein said metal sheet is plastically deformed with a press ram provided as a matrix.

11. The method according to claim 9, wherein said metal sheet is pressed at least twice, said metal sheet at least in said first pressing process being pressed with a matrix formed as a press ram.

12. The method according to claim 11, wherein said press ram has a surface which results in high metal deforming.

13. The method according to claim 8, wherein said metal sheet is plastically deformed by heating.

14. The method according to claim 13, wherein said metal sheet is tempered or heated and subsequently slowly cooled.

15. The method according to claim 8, wherein said metal sheet is plastically deformed across its entire thickness, resulting in a continuously deformed metal sheet portion.

16. A cooking device with a cooking chamber and a cooking chamber wall, at least one portion of said cooking chamber wall forming said plastically deformed metal sheet of the energy transfer cooking device accessory according to claim 1, so that said portion of said cooking chamber wall forms a magnetically permeable coupling point for said primary circuit and said secondary circuit of the transformer-like power transfer unit.

* * * * *